US012674621B2

(12) United States Patent
Charmet

(10) Patent No.: US 12,674,621 B2
(45) Date of Patent: Jul. 7, 2026

(54) CALCINATION UNIT FOR DECARBONATING RAW MATERIALS

(71) Applicant: FIVES FCB, Villeneuve d'Ascq (FR)

(72) Inventor: Jean-Michel Charmet, Villeneuve d'Ascq (FR)

(73) Assignee: FIVES FCB, Villeneuve d'Ascq (FR)

( * ) Notice: Subject to any disclaimer, the term of this patent is extended or adjusted under 35 U.S.C. 154(b) by 538 days.

(21) Appl. No.: 18/547,582

(22) PCT Filed: Feb. 17, 2022

(86) PCT No.: PCT/FR2022/050291

§ 371 (c)(1),
(2) Date: Aug. 23, 2023

(87) PCT Pub. No.: WO2022/180326

PCT Pub. Date: Sep. 1, 2022

(65) Prior Publication Data

US 2024/0133630 A1     Apr. 25, 2024
US 2024/0230233 A9     Jul. 11, 2024

(30) Foreign Application Priority Data

Feb. 23, 2021    (FR) ........................................ 2101761

(51) Int. Cl.

| | |
|---|---|
| F27B 15/08 | (2006.01) |
| C04B 7/43 | (2006.01) |
| C04B 7/44 | (2006.01) |
| C04B 7/47 | (2006.01) |
| F23K 3/00 | (2006.01) |
| F27B 15/16 | (2006.01) |
| F27D 25/00 | (2010.01) |

(52) U.S. Cl.
CPC .............. *F27B 15/08* (2013.01); *C04B 7/432* (2013.01); *C04B 7/4461* (2013.01); *C04B 7/475* (2013.01);

(Continued)

(58) Field of Classification Search
CPC .. F27B 15/08; F27B 15/16; F27B 1/16; F27B 7/2033; F27B 1/005; C04B 7/432;

(Continued)

(56) References Cited

U.S. PATENT DOCUMENTS

| | | | | |
|---|---|---|---|---|
| 4,078,882 A | * | 3/1978 | Houd ...................... | F27B 7/383 |
| | | | | 432/106 |
| 4,238,237 A | * | 12/1980 | Jarrett ..................... | C04B 7/434 |
| | | | | 106/758 |

(Continued)

FOREIGN PATENT DOCUMENTS

| | | |
|---|---|---|
| GB | 1523621 A1 | 9/1978 |
| JP | S59128237 A | 7/1984 |

OTHER PUBLICATIONS

International Search Report issued on May 25, 2022, in corresponding International Patent Application No. PCT/FR2022/050291, 5 pages.

*Primary Examiner* — David J Laux
(74) *Attorney, Agent, or Firm* — Maier & Maier, PLLC

(57) ABSTRACT

A calcination unit able to decarbonate raw materials intended for clinker production, the unit including: a main duct in which the raw materials circulate according to a first movement direction, the raw materials being calcined in the main duct; a solid fuel supply duct opening onto the main duct via a fuel outlet, the solid fuel moving according to a second movement direction; a retaining device located in the main duct and arranged opposite the solid fuel outlet so that the solid fuel arriving in the main duct via the fuel outlet passes through the retaining device.

15 Claims, 1 Drawing Sheet

(52) U.S. Cl.
 CPC ................ *F23K 3/00* (2013.01); *F27B 15/16*
 (2013.01); *F27D 25/008* (2013.01); *F27M*
 *2003/03* (2013.01)

(58) Field of Classification Search
 CPC ....... C04B 7/4461; C04B 7/475; C04B 7/434;
 F23K 3/00; F27D 25/008; F27D 5/00;
 F27M 2003/03
 See application file for complete search history.

(56) References Cited

U.S. PATENT DOCUMENTS

| | | | | |
|---|---|---|---|---|
| 4,295,823 | A * | 10/1981 | Ogawa | C04B 7/43 |
| | | | | 432/106 |
| 4,329,180 | A * | 5/1982 | Herchenbach | F27B 7/2033 |
| | | | | 432/106 |
| 4,372,784 | A * | 2/1983 | Hess | F27B 7/2033 |
| | | | | 432/106 |
| 4,640,203 | A * | 2/1987 | Wolter | B01D 53/34 |
| | | | | 110/345 |
| 5,816,795 | A * | 10/1998 | Hansen | F27B 7/2033 |
| | | | | 432/106 |
| 5,989,017 | A * | 11/1999 | Evans | F27B 7/20 |
| | | | | 432/106 |
| 6,210,154 | B1 * | 4/2001 | Evans | F27B 7/20 |
| | | | | 432/106 |
| 2017/0260089 | A1 * | 9/2017 | Klegraf | F27B 7/34 |
| 2020/0392041 | A1 * | 12/2020 | Charmet | C04B 7/4446 |
| 2024/0002290 | A1 * | 1/2024 | Charmet | C04B 7/12 |
| 2024/0133630 | A1 * | 4/2024 | Charmet | F27B 7/2033 |

* cited by examiner

CALCINATION UNIT FOR DECARBONATING RAW MATERIALS

FIELD

The invention relates to a calcination unit intended to decarbonate raw materials for clinker production.

BACKGROUND

Cement manufacture uses for the most part a fired material, clinker, which is produced from minerals of which the essential constituent is calcium carbonate.

Clinker is produced from a mixture of raw mineral materials extracted from natural deposits, is including clay, a source of aluminosilicates, and limestone, a source of calcium carbonate. These minerals are successively mixed, dried, ground, preheated, decarbonated and then fired and partially melted in a rotary furnace up to a temperature of about 1500° C., then the clinker thus formed is cooled.

Cement is obtained by finely grinding a mixture mostly composed of clinker.

In the clinker manufacturing process, the raw materials are calcined in a calcination unit in order to extract the carbon dioxide, this is decarbonation.

Calcination requires a fuel, which represents a significant operating cost. In order to reduce these operating costs, it is common to feed in alternative fuels. These differ from conventional fuels, namely coal and hydrocarbons. An example of an alternative fuel is strip-shredded tires.

By their nature and their dimensions, alternative fuels are sometimes difficult to consume. This has the consequence of affecting the quality of the clinker, and therefore of the produced cement, and the operating stability of the firing line. Thus, cement producers are forced to limit the amounts of alternative fuels used in the firing line, in order to prevent these phenomena from occurring. An alternative for cement producers is to shred the alternative fuels before use, to substantially reduce their dimensions. These operations are expensive for several reasons, including the energy-intensive nature of the shredders and their maintenance in particular.

Cement manufacturers have attempted to solve this problem. Among these attempts, one consists in increasing the stay time of the alternative fuel so it consumes completely. According to this solution, a calcination unit includes a main pipe in which the raw materials circulate and an alternative fuel supply pipe opening into the main sleeve. The supply pipe includes a series of descending steps on which the alternative fuel rests and consumes as it moves in the supply pipe in the direction of the main pipe. At the end of the travel, i.e. at the junction with the main pipe, the alternative fuel falls into the main pipe where it is carried by the gases conveying the raw materials.

Despite the fact that this technical solution confers some improvement on the quality of the clinker, it is still perfectible.

A drawback of this technical solution lies in the fact that the combustion gas merely "licks" the alternative fuel from above. The combustion is then degraded.

Another drawback lies in the fact that despite a longer stay time of the alternative fuel in the supply pipe, unconsumed alternative fuel is found in the raw materials.

The invention aims to overcome the aforementioned drawbacks.

SUMMARY

To this end, a calcination unit able to decarbonate raw materials intended for clinker production is provided, the unit comprising:

a main duct in which the raw materials circulate according to a first movement direction, the raw materials being calcined in the main duct, the main duct including a recess, a solid fuel supply duct opening onto the main duct via a fuel outlet, the fuel outlet opening into the recess, the solid fuel moving according to a second movement direction, a retaining device located in the recess of the main duct and arranged opposite the solid fuel outlet so that said solid fuel arriving in the main duct via the fuel outlet is sent towards said retaining device, unit in which the retaining device includes retaining elements and passages separating two adjacent retaining elements.

The calcination assembly including a retaining device thus arranged has several advantages. A first advantage is that the hot gases conveying the raw materials in the main duct pass through the retaining device, and therefore pass throughout the solid fuel, which significantly improves the combustion of the solid fuels. Another advantage is that the solid fuel is consumed on the retaining device, which avoids solid fuel being found in the raw materials and subsequently in the clinker. Thus, the usage rate of the solid fuels could be increased while guaranteeing the quality of the clinker and the stability of the firing line.

Various additional features can be provided alone or in combination:

the main duct includes a lateral wall, said lateral wall defining an inlet portion having an inlet section, and an enlarged portion having an enlarged section larger than the inlet section and an outlet portion having an outlet section smaller than the enlarged section, the recess being located in the enlarged portion between two points extending according to the first movement direction of the raw materials;

the main duct includes a narrowed portion having a narrowed section smaller than the inlet section, the narrowed portion being located upstream of the enlarged portion and downstream of the inlet portion, according to the first movement direction of the raw materials;

the fuel retaining device is able to retain solid fuel one of the dimensions of which is at least equal to a determined value;

two adjacent retaining elements are spaced apart by a distance comprised between 30 and 70 millimetres;

the retaining device is able to block solid fuels at least one of the dimensions of which is larger than 50 millimetres;

the retaining elements are arranged so as to define an angle of inclination comprised between 5° and 30°, said angle of inclination being measured between a transverse axis substantially perpendicular to the movement direction of the raw materials, and an axis of extension passing through all of the retaining elements;

the angle of inclination is measured clockwise so that the retaining elements are oriented so that the solid fuels are projected towards the recess;

the calcination unit includes a hot air supply duct opening into the recess via a hot air outlet, said hot air outlet being arranged opposite the retaining device so that the hot air passes through the retaining device;

the calcination unit comprises a lower wall located in the recess and arranged opposite and upstream of the retaining device according to the movement direction of the raw materials, the calcination unit including at least one cleaning channel opening onto the lower wall via at least one air injection outlet, said air injection outlet allowing evacuating solid fuels stuck on said lower wall.

Secondly, a clinker production plant is provided, comprising:

a preheating unit, in which raw material is preheated, a calcination unit as described before, in which the preheated raw material is at least partially decarbonated, a furnace in which the preheated and at least partially decarbonated raw material is fired, a cooler in which the fired material from the furnace is cooled by cooling air.

Thirdly, a method for producing clinker by means of a plant, as described before, is provided, wherein the latter includes the following operations:

injecting an alternative solid fuel into the calcination unit via the solid fuel supply conduit, said alternative fuel comprising particles with a dimension larger than 50 millimetres, hereinafter referred to as large-size particles, retaining large-size particles by means of the retaining device, consuming the large-size particles on the retaining device until their dimensions become smaller than 50 millimetres, said particles then passing through the passages between the retaining elements.

Various additional features can be provided alone or in combination:

the latter includes an operation of injecting hot air into the recess via the hot air supply duct;

the hot air is derived from cooling of the clinker in the cooler;

the method includes an operation of injecting compressed air via the cleaning channels to evacuate the solid fuel stuck on the lower wall of the recess.

BRIEF DESCRIPTION OF THE FIGURE

Other features and advantages of the invention will appear upon reading the following detailed description for an understanding of which reference will be made to the appended drawing wherein:

FIG. 1 is a schematic illustration of a section of a calcination unit according to the invention.

DETAILED DESCRIPTION

A calcination unit 1 is shown in FIG. 1. The calcination unit 1 is able to decarbonate raw materials intended for clinker production.

The calcination unit 1 comprises a main duct 2. In this main duct 2, the raw materials, conveyed by gases, circulate according to a first movement direction illustrated by a first arrow 3. The raw materials are calcined in the main duct 2.

The calcination unit 1 comprises a solid fuel supply duct 4. The solid fuel supply duct 4 opens onto the main duct 2 via a fuel outlet 5. In the supply line 4, the solid fuel moves according to a second movement direction, illustrated by a second arrow 6.

The calcination unit 1 comprises a retaining device 7. The retaining device 7 is located in the main duct 2, i.e. in the same duct in which the hot gases coming out of a firing furnace circulate. The retaining device 7 is arranged opposite the fuel outlet 5. Thus, the solid fuel arriving in the main duct 2 via the fuel outlet 5 passes through the retaining device 7.

The calcination unit 1 including a retaining device 7 thus arranged has several advantages. A first advantage is that the hot gases conveying the raw materials in the main duct 2, pass through the retaining device 7, and therefore pass throughout the solid fuel, which significantly improves the combustion of the solid fuels. Another advantage is that the solid fuel is consumed on the retaining device 7, which avoids solid fuel being found in the raw materials and subsequently in the clinker. Thus, the usage rate of the solid fuels could be increased while guaranteeing the quality of the clinker and the stability of the firing line.

Advantageously, the main duct 2 includes a recess 8. The recess 8 is in the form of a hollow portion locally enlarging the main duct 2. The fuel supply duct 4 opens into the recess 8 via the fuel outlet 5. The retaining device 7 is arranged in the recess 8.

Such an arrangement allows not obstructing the main duct 2 while enabling the gases conveying the raw materials to pass through the retaining device 7, and therefore, the solid fuel.

Advantageously, the main duct 2 includes a lateral wall 9. The lateral wall 9 delimits the main duct 2 over its periphery. The lateral wall 9 defines an inlet portion 10 having an inlet section 11. The lateral wall 9 also defines an enlarged portion 12 having an enlarged section 13 larger than the inlet section 11.

The enlarged portion 12 extends between two points P1, P2 according to the first movement direction. Between the two points P1, P2, the enlarged section 13 is larger than the inlet section 11.

By the aforementioned expression "passes through the retaining device 7", it should be understood that the alternative fuel is sent into the enlarged portion 12 while passing beforehand via the retaining device 7.

Advantageously, the main duct 2 includes a narrowed portion 14 having a narrowed section 15. The narrowed section 15 is smaller than the inlet section 11. The narrowed portion 14 is located upstream of the enlarged portion 12 according to the first movement direction. The sections are measured in unit area, namely in square metres.

The narrowed portion 14 thus arranged allows locally accelerating the flow of the gases conveying the raw materials. This acceleration, followed by an expansion due to the enlarged portion 12, allows suspending the alternative fuel in the gases conveying the raw materials.

The main duct 2 includes an outlet portion 27 located downstream of the enlarged portion 12 according to the first movement direction. The outlet portion 27 has an outlet section 28 smaller than the enlarged section 13 of the enlarged portion 12.

In the embodiment shown in FIG. 1, the inlet portion 10 located upstream of the enlarged portion 12 according to the first movement direction has an inlet section 11 different from the outlet section 28 of the outlet portion 27.

Advantageously, the retaining device 7 includes retaining elements 16. The retaining elements 16 are separated from each other by passages 17. Thus, two adjacent retaining elements 16 are separated by a passage 17. Advantageously, two adjacent retaining elements 16 are spaced apart by a distance 18 comprised between 30 and 70 millimetres, preferably about 50 millimetres.

The hot gases conveying the raw materials in the main duct 2, thereby passing through the retaining device 7, and therefore pass throughout the solid fuel, which significantly improves the combustion of the solid fuels.

Advantageously, the retaining elements 16 are made of a refractory material withstanding high temperatures, typically higher than 800° C. As a non-limiting example, such a refractory material is silicon carbide, a nickel/chromium based alloy or refractory stainless steel. According to one variant, the retaining elements 16 may be manufactured of a non-refractory material having a lower resistance to high temperatures, in this case, the retaining elements 16 are cooled by means of a heat-transfer fluid.

Advantageously, the retaining elements are made of a heat-resistant material. Advantageously, the retaining elements are made of silicon carbide.

Such a retaining device 7 allows retaining solid fuels that might be not consumed in the main duct 2.

Advantageously, the fuel retaining device 7 is able to retain solid fuel one of the dimensions of which is at least equal to a determined value.

Advantageously, the retaining device 7 is able to block fuels at least one of the dimensions of which is larger than 50 millimetres.

Solid fuels having at least one of their dimensions larger than 50 millimetres might be not entirely consumed when arriving in the main duct 2, and therefore pollute the clinker. Such a retaining device 7 allows trapping the solid fuels having at least one dimension larger than 50 millimetres. These trapped solid fuels are consumed in the retaining device 7 before passing throughout the latter or being driven by the flow of gas conveying the raw materials, which allows obtaining a clinker free of unconsumed solid fuel.

Advantageously, the retaining elements 16 extend according to an axis 19 of extension passing through all retaining elements 16. The axis 19 of extension defines an angle α with a transverse axis 20 substantially perpendicular to the first movement direction. The angle α is comprised between 5° and 30°, preferably between 15° and 25°.

Such an arrangement allows preventing the solid fuels arriving at a given speed from the supply duct 4 from bouncing on the retaining device 7 and being ejected towards the main duct 2 without having been properly consumed.

Advantageously the angle α is measured clockwise so that the retaining elements 16 are oriented in the direction of the recess 8. Thus, the solid fuels are projected towards the recess 8 rather than the main duct 2.

This allows avoiding solid fuels from being ejected into the main duct 2.

Advantageously, the retaining device 7 comprises a lateral retaining element 26. The lateral retaining element 26 is arranged at one end of the retaining device 7, said end being located on the side of the recess 8. The lateral retaining element 26 prevents the solid fuels from falling out of the retaining device 7.

Advantageously, the calcination unit 1 comprises a hot air supply duct 21, hereinafter referred to as hot air duct 21. The hot air duct 21 opens into the recess 8 via a hot air outlet 22. Advantageously, the hot air outlet 22 is arranged opposite the retaining device 7 so that the hot air passes through said retaining device 7.

This arrangement of the hot air outlet 22 allows improving the combustion of the solid fuel trapped in the retaining device 7. Indeed, the input of hot air directly onto the retaining device 7 improves the combustion conditions of the solid fuel.

Advantageously, the calcination unit 1 comprises a lower wall 23 located in the recess 8. The lower wall 23 is arranged opposite and upstream of the retaining device 7 according to the movement direction of the raw materials. The lower wall 23 defines with the lateral wall 9 substantially parallel to the first arrow 3 an angle β advantageously between comprised 130° and 170°. The angle β is about 150°. The angle β is measured counterclockwise starting from the lateral wall 9. Such an angle allows improving the suspension of the alternative fuel in the gas flow conveying the raw materials, while avoiding large amounts of alternative fuel sticking on the lower wall 23.

The calcination unit 1 includes at least one cleaning channel 24. The cleaning channel 24 opens onto the lower wall 23 via an air injection outlet 25. Advantageously, the air injection outlet 25 allows evacuating solid fuels stuck on the lower wall 23. Indeed, solid fuel residues could remain stuck on the lower wall 23. This is particularly the case when the solid fuels are rubbery.

Advantageously, the invention relates to a plant (not shown in the drawings) comprising:

- a preheating assembly, in which the raw material is preheated,
- a calcination unit 1 as described before, in which the preheated raw material is at least partially decarbonated,
- a furnace in which the preheated and at least partially decarbonated raw material is fired,
- a cooler in which the fired material from the furnace is cooled by cooling air.

Advantageously, the plant comprises a compressed air production device connected to the cleaning channel 24.

Next, a method for producing clinker by means of the aforementioned plant will be described.

The method includes an operation of injecting an alternative solid fuel into the calcination assembly 1. The alternative solid fuel is fed via the solid fuel supply duct 4. The alternative solid fuel comprises particles at least one dimension of which is larger than 50 millimetres. These particles are hereinafter referred to as large-size particles.

The method comprises an operation consisting in retaining the large-size particles by means of the retaining device 7.

The method includes an operation consisting in burning the large-size particles on the retaining device 7 until their dimensions becomes smaller than 50 millimetres, said particles then passing in the passages 17 between the retaining elements 16.

Advantageously, the method includes an operation of injecting hot air into the recess 8 via the hot air duct 21. This allows promoting the consumption of the solid fuel trapped in the retaining device 7.

Advantageously, the hot air is derived from cooling of the clinker in the cooler.

Advantageously, the method includes an operation of injecting compressed air into the cleaning channel 24. This allows evacuating the solid fuel stuck on the lower wall 23 of the recess 8.

The invention claimed is:

1. A calcination unit able to decarbonate raw materials intended for clinker production, the unit comprising:

a main duct in which the raw materials circulate according to a first movement direction, the raw materials being calcined in the main duct, the main duct including a recess, a solid fuel supply duct opening onto the main duct via a fuel outlet, the fuel outlet opening into the recess, the solid fuel moving according to a second movement direction, a retaining device located in the recess of the main duct and arranged opposite the solid fuel outlet so that said solid fuel arriving in the main duct via the fuel outlet is sent towards said retaining device, wherein the retaining device includes retaining elements and passages separating two adjacent retaining elements.

2. The unit according to claim 1, wherein the main duct includes a lateral wall, said lateral wall defining an inlet portion having an inlet section, and an enlarged portion having an enlarged section larger than the inlet section and an outlet portion having an outlet section smaller than the enlarged section, the recess being located in the enlarged portion between two points extending according to the first movement direction of the raw materials.

3. The unit according to claim 2, further comprising a hot air supply duct opening into the recess via a hot air outlet, said hot air outlet being arranged opposite the retaining device so that the hot air passes through the retaining device.

4. The unit according to claim 2, further comprising a lower wall located in the recess and arranged opposite and upstream of the retaining device according to the movement direction of the raw materials, the calcination unit including at least one cleaning channel opening onto the lower wall via at least one air injection outlet, said air injection outlet allowing evacuating solid fuels stuck on said lower wall.

5. The unit according to claim 2, wherein the main duct includes a narrowed portion having a narrowed section smaller than the inlet section, the narrowed portion being located upstream of the enlarged portion and downstream of the inlet portion, according to the first movement direction of the raw materials.

6. The unit according to claim 1, wherein the fuel retaining device is able to retain solid fuel one of the dimensions of which is at least equal to a determined value.

7. The unit according to claim 1, wherein two adjacent retaining elements are spaced apart by a distance comprised between 30 and 70 millimetres.

8. The unit according to claim 7, wherein the retaining elements are arranged so as to define an angle of inclination comprised between 5° and 30°, said angle of inclination being measured between a transverse axis substantially perpendicular to the movement direction of the raw materials, and an axis of extension passing through all of the retaining elements.

9. The unit according to claim 8, wherein the angle of inclination is measured clockwise so that the retaining elements are oriented so that the solid fuels are projected towards the recess.

10. The unit according to claim 1, wherein the retaining device is able to block solid fuels at least one of the dimensions of which is larger than 50 millimetres.

11. A clinker production plant comprising:

a preheating unit, in which raw material is preheated, a calcination unit according to claim 1, in which the preheated raw material is at least partially decarbonated, a furnace in which the preheated and at least partially decarbonated raw material is fired, a cooler in which the fired material from the furnace is cooled by cooling air.

12. A method for producing clinker by means of a plant according to claim 11, wherein the latter includes the following operations:

injecting an alternative solid fuel into the calcination unit via the solid fuel supply conduit, said alternative fuel comprising particles with a dimension larger than 50 millimetres, hereinafter referred to as large-size particles, retaining large-size particles by means of the retaining device, consuming the large-size particles on the retaining device until their dimensions become smaller than 50 millimetres, said particles then passing through the passages between the retaining elements.

13. The method for producing clinker according to claim 12, further comprising injecting hot air into the recess via the hot air supply duct.

14. The clinker production method according to claim 13, wherein the hot air is derived from cooling of the clinker in the cooler.

15. The method for producing clinker according to claim 12, further comprising injecting compressed air via the cleaning channels to evacuate the solid fuel stuck on the lower wall of the recess.

* * * * *